March 8, 1966  R. S. BATT  3,239,291
BEARINGS
Filed Sept. 23, 1963  2 Sheets-Sheet 1
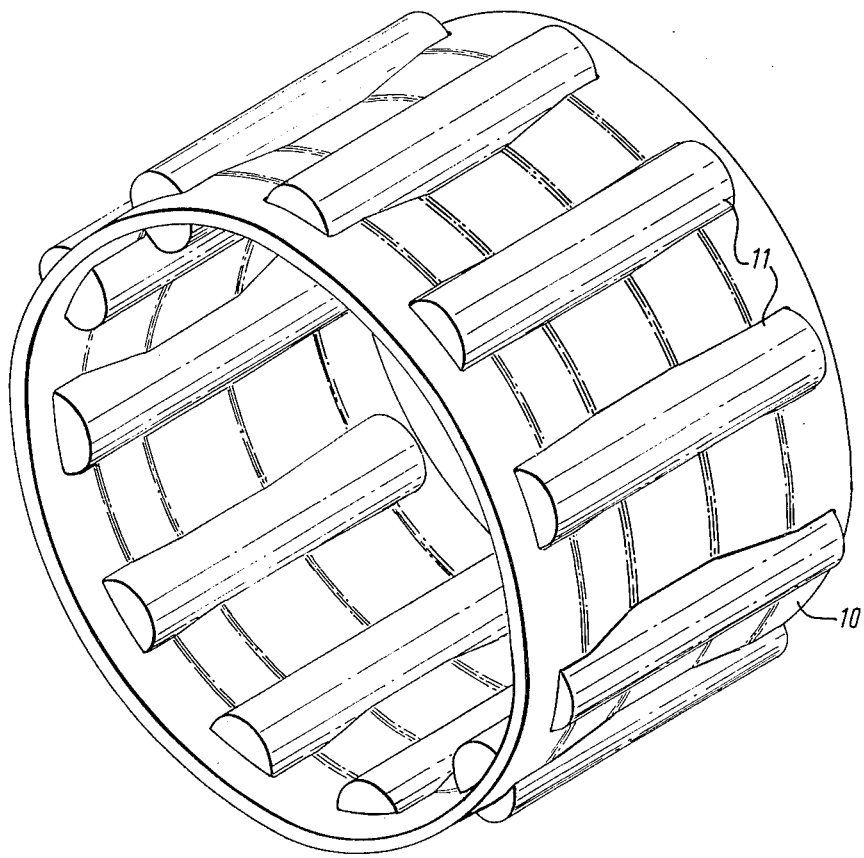
— FIG. 1 —
R. S. BATT
INVENTOR
by Mason, Porter, Diller & Stewart
ATTORNEYS.

March 8, 1966 R. S. BATT 3,239,291
BEARINGS
Filed Sept. 23, 1963 2 Sheets-Sheet 2
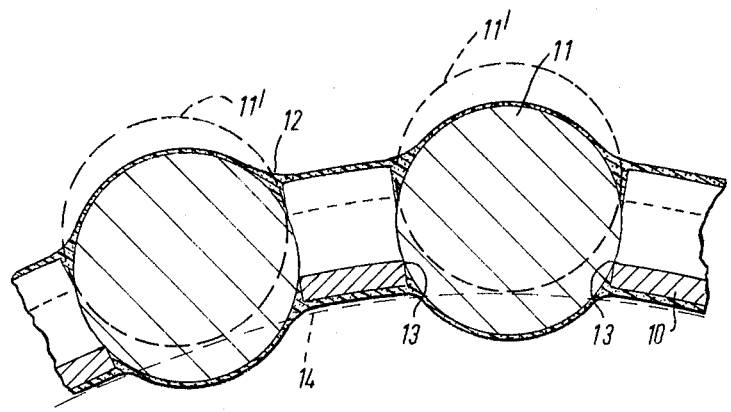
— FIG. 2. —
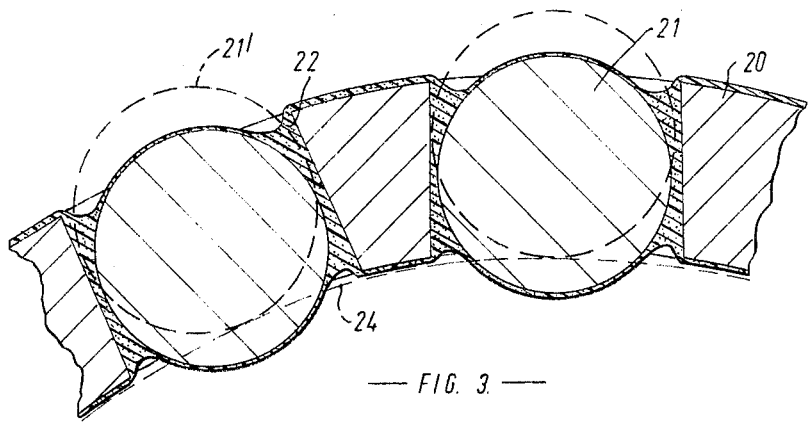
— FIG. 3. —
R. S. BATT
INVENTOR
ATTORNEYS.

United States Patent Office 3,239,291
Patented Mar. 8, 1966

3,239,291
BEARINGS
Robert S. Batt, Coventry, England, assignor to The Torrington Company Limited, Coventry, England
Filed Sept. 23, 1963, Ser. No. 310,563
Claims priority, application Great Britain, Sept. 26, 1962, 36,527/62
9 Claims. (Cl. 308—217)

The present invention relates to roller bearings and more particularly to means whereby the needles or rollers may be retained in their cage before assembly of the bearing.

It is common practice, in the bearing industry, to manufacture and sell needles or rollers for use with the customer's own inner and outer bearing races. In such cases a guiding cage is sometimes desirable. For the customer's convenience the needles or rollers should be pre-assembled with the cage. Cages which are both inwardly and outwardly retentive are expensive to manufacture and require expensive tooling.

It is an object of the present invention to enable pre-assembled caged roller assemblies to be manufactured and sold without using doubly-retentive cages and without substantial risk of the needles or rollers falling out of place before the assemblies are installed.

According to one aspect of the present invention a caged roller assembly comprises a roller cage and rollers secured in assembly in the cage by a wax bonding. Preferably the wax is a grease or oil-based wax which may readily blend with another lubricant which is used after installation of the bearing in its races.

In one embodiment of the invention the cage prevents the rollers moving inwardly, i.e. it is inwardly retentive, and the wax prevents the rollers falling outwardly. In another embodiment the cage is non-retentive and the wax prevents the rollers falling either inwardly or outwardly. In the first case the rollers are preferably touching the cage prior to being secured in position by the wax in the second case the rollers are preferably disposed at a smaller diameter than that at which they will operate when they are installed. By this means the wax bond is broken upon insertion of the shaft and the risk of an initial skidding action due to the wax is minimised. The cage assembly is naturally inserted in the outer roller race before insertion of the shaft.

In a further embodiment, the cage prevents the rollers falling outwardly and the wax prevents the rollers falling inwardly. In this embodiment the rollers are again preferably waxed whilst they are touching the cage so that the wax bonding is broken upon the cage being inserted in the outer roller race.

According to another aspect of the present invention, a method of making a caged roller assembly comprises establishing a magnetic field in the region of a cage, retaining rollers in position in the cage by said magnetic field, bonding the rollers to the cage with wax, preferably a grease or oil based wax, removing the magnetic field and, if necessary, demagnetizing the waxed assembly.

The invention is further described by way of example with reference to the accompanying drawings in which:

FIG. 1 is a perspective view of a caged roller assembly according to the invention;

FIG. 2 is an enlarged detailed section of the assembly of FIG. 1; and flexibility to the wax. The cage 10 is inwardly retentive and the rollers 11 are waxed in position so that they touch the cage at points 13. The outer periphery of the shaft to be used with the caged roller assembly is indicated by the dotted curve 14 and it will be seen from FIG. 2 that, upon insertion of such a shaft, the rollers 11 are moved to the position 11' indicated by chain dotted lines. This breaks the wax bonding and facilitates turning of the rollers when the cage assembly is first installed. The cage assembly will naturally be placed in its outer roller race before the shaft is inserted.

Caged roller assemblies of the type shown in FIGS. 1 and 2 may be made as follows: Inwardly retentive cages 10 complete with rollers 11 are inserted into cylindrical non-magnetic containers (not shown) to temporarily hold the rollers 11 in position. The containers are placed on a flat surface with the cages protruding upwardly and magnetic bars (not shown) are lowered onto the cages. The bars are then raised bringing the cages with them and the rollers held in position by the magnetism. The rollers and cages are then heated to a suitable temperature and dipped into a bath of molten wax. After removal, draining and cooling of the waxed assemblies the assemblies may be lowered onto a flat surface and removed from the magnetic bars, e.g. by switching off the current in the case of an electromagnet. The assemblies may then be de-magnetized and packed.

In the embodiment of FIG. 3, the cage 20 is non-retentive and the rollers 21 are bonded by a wax film 22 in an inward position. The outer periphery of the shaft to be used with the roller assembly of FIG. 3 is indicated by the dotted line 24 and it will be seen that upon insertion of the shaft the rollers are moved outwardly to a position 21' to break the wax bond as in the embodiment of FIGS. 1 and 2.

I claim:

1. A caged roller assembly for a roller bearing comprising a singly retentive roller cage, a plurality of rollers for said cage, said cage being of the kind to prevent rollers falling from the cage in one radial direction, and wax bonding said rollers in position in said cage in positions which are spaced in said one radial direction from the positions which said rollers will adopt when the roller assembly is installed in said roller bearing and so that the wax bonding is broken when the cage is installed in said roller bearing.

2. A caged roller assembly for a roller bearing comprising an inwardly retentive roller cage, a plurality of rollers and wax bonding said rollers in position in said cage which positions are spaced radially inwardly from the positions which the rollers will adopt upon installation of the roller assembly in said roller bearing and so that the wax bonding is broken when the cage is installed in said roller bearing.

3. A caged bearing assembly comprising a cage and a plurality of rolling bearing elements, said cage loosely receiving each of said rolling bearing elements for relative radial shifting movement to radially opposite sides of a normal operating position of the rolling bearing element within said cage, and a readily frangible bonding agent temporarily bonding each rolling bearing element in said cage in a position radially offset from the normal operating position of said rolling bearing element whereby when said caged bearing assembly is positioned between two cooperating bearing races said rolling bearing ele- 6. A caged bearing assembly particularly adapted for insertion between first and second races and wherein said assembly is normally assembled first with the first race and then with the second race; said assembly comprising a cage having a first surface adapted to oppose the first race and an oppositely disposed second surface adapted to oppose the second race, a plurality of rolling bearing elements each seated in said cage for later movement generally between said cage surface on opposite sides of a normal operating position, and a readily frangible bonding agent temporarily bonding each of said rolling bearing elements in said cage in a position disposed towards said cage second surface from the normal operating position of said rolling bearing element whereby said assembly may be readily positioned relative to a first race and then a second race positioned relative to said assembly with the second race automatically breaking said rolling bearing elements free from said cage.

7. A caged bearing assembly particularly adapted for insertion between an outer race and an inner race and wherein said assembly is normally assembled first with the inner race and then with the outer race; said assembly comprising a cage, a plurality of rolling bearing elements each seated in said cage radially outwardly of the normal operating position of said rolling bearing element, and a readily frangible bonding agent temporarily bonding each of said rolling bearing elements in said cage in said radially outwardly displaced position whereby said assembly may be readily positioned relative to an inner race and then when assembled with respect to an outer race the contact of the rolling bearing elements with the outer race will automatically break said rolling bearing elements free from said cage.

8. A caged bearing assembly particularly adapted for insertion between a shaft and an outer race and wherein said assembly is normally assembled first with the outer race and then with the shaft; said assembly comprising a cage, a plurality of rolling bearing elements each seated in said cage in a position radially offset inwardly of the normal operating position of said rolling bearing element, and a readily frangible bonding agent temporarily bonding each of said rolling bearing element in said cage in said radially inwardly offset position whereby said assembly may be readily positioned within an outer race and then when a shaft is past through the assembly, the shaft will automatically engage the radially inwardly displaced rolling bearing elements and force the same radially outwardly breaking said rolling bearing elements free from said cage.

9. The caged roller assembly of claim 2 wherein said wax bonding said rollers in position in said cage is a part of an over-all coating of wax completely covering said rollers and said cage.

References Cited by the Examiner

UNITED STATES PATENTS

| 725,763 | 4/1903 | Noyes | 308—217 |
| 1,907,015 | 5/1933 | Swart | 308—217 |
| 1,947,004 | 2/1934 | Goddard | 29—148.4 |
| 3,050,353 | 8/1962 | Bratt | 308—217 |
| 3,057,045 | 10/1962 | Johnson | 29—148.4 |
| 3,057,667 | 10/1962 | Gothberg | 308—217 |

FOREIGN PATENTS

| 1,155,833 | 8/1958 | France. |

DAVID J. WILLIAMOWSKY, *Primary Examiner.*

ROBERT C. RIORDON, DON A. WAITE, *Examiners.*

F. C. HAND, F. SUSKO, *Assistant Examiners.*